United States Patent [19]

Spirig

[11] 4,113,601

[45] Sep. 12, 1978

[54] WATER DECOMPOSING APPARATUS

[76] Inventor: Ernst Spirig, Movenstrasse 37, CH-8640 Rapperswil, Switzerland

[21] Appl. No.: 765,677

[22] Filed: Feb. 4, 1977

[30] Foreign Application Priority Data

Dec. 9, 1976 [GB] United Kingdom .............. 51446/76

[51] Int. Cl.² ............................................. C25B 15/00
[52] U.S. Cl. .................................. 204/230; 204/237; 204/270; 204/272
[58] Field of Search .............. 204/129, 270, 269, 272, 204/278, 237, 234–239, 229, 230

[56] References Cited

U.S. PATENT DOCUMENTS

| 3,891,534 | 6/1975 | Cordone et al. ..................... 204/272 |
| 3,984,303 | 10/1976 | Peters et al. ..................... 204/272 X |
| 3,990,962 | 11/1976 | Götz ................................. 204/272 X |
| 4,014,777 | 3/1977 | Brown ............................. 204/272 X |

Primary Examiner—Charles F. Lefevour
Attorney, Agent, or Firm—Lawrence E. Laubscher

[57] ABSTRACT

A water decomposition apparatus for producing detonating gas or oxyhydrogen gas comprises a plurality of electrolytic cells formed between a nested plurality of endless laminar electrodes each sealingly abutting at its upper and lower edges against elastomeric insulating layers on the surfaces of rigid plates. Electrolyte circulation through the assembly is permitted by an inlet aperture in one extreme cell, an outlet aperture in the other extreme cell and an aperture in each intermediate electrode adjacent its upper edge. The inlet and outlet apertures are coupled for electrolyte circulation by immersing the assembly in electrolyte or by an extended duct system connecting the apertures. Current is supplied to the extreme inner and outer electrodes from a d.-c. source. Control means may be provided to reduce the magnitude of the current as the gas pressure rises. A plurality of assemblies may be connected electrically in series across the d.-c. supply. When an electrode assembly is to be immersed in electrolyte its outermost electrode is surrounded by an electrically inoperative shielding member sealingly engaging the insulating members.

13 Claims, 7 Drawing Figures

1

WATER DECOMPOSING APPARATUS

BACKGROUND OF THE INVENTION

The present invention relates to a new and improved construction of water decomposition apparatus for producing detonating gas or oxyhydrogen gas. U.S. Pat. No. 3,957,618 granted to the present applicant on May 18, 1976 for WATER DECOMPOSITION APPARATUS FOR PRODUCING DETONATING GAS describes an apparatus including a concentric array of open-topped electrolytic cells through which electrolyte passes in succession. The cells are of progessively different heights and the flow of electrolyte is produced by successive overflowing from each into the next.

SUMMARY OF THE INVENTION

It is a primary object of the present invention to provide a multi-cell electrolysis apparatus for producing detonating gas, that is a water decomposition apparatus for generating detonating gas or oxyhydrogen gas having advantages over the known apparatus.

It is a particular object of the invention to provide water decomposition apparatus in which the level of electrolyte is self-regulating.

It is also an object of the invention to provide water decomposition apparatus that may be operated either immersed in electrolyte or with an enclosed electrolyte circulatory system.

According to an advantageous embodiment of the invention the electrodes bounding the electrolytic cells are in the form of frusta of hollow cones having a vertical common axis, the upper and lower edges of the electrodes sealingly abutting layers of elastomeric insulating material applied to surfaces of rigid support plates held against the electrodes by resiliently biased damping means. Circulation of electrolyte through the assembly is provided by an inlet aperture in the lower support plate entering one extreme cell of the assembly, an outlet aperture through the upper support plate through which electrolyte may leave the other extreme cell of the assembly, and an aperture in each intermediate electrode adjacent its top edge. The assembly has its innermost and outermost electrodes connected to a d.-c. source. The assembly may be immersed in a tank of electrolyte in which case the outermost electrode is surrounded by an electrically inoperative shielding member sealingly abutting the elastomeric layers to prevent bypassing of current applied to the assembly.

DESCRIPTION OF THE PREFERRED EMBODIMENTS

Figure 1:
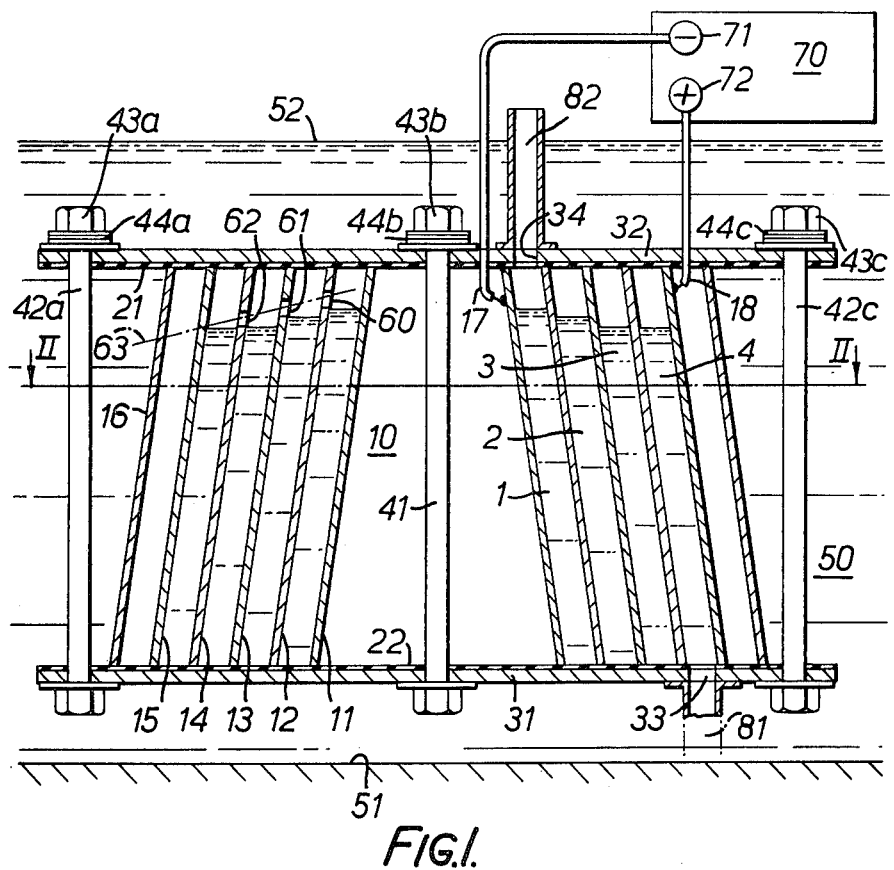
FIG. 1 is a vertical section through one embodiment of apparatus in accordance with the invention.
Figure 2:
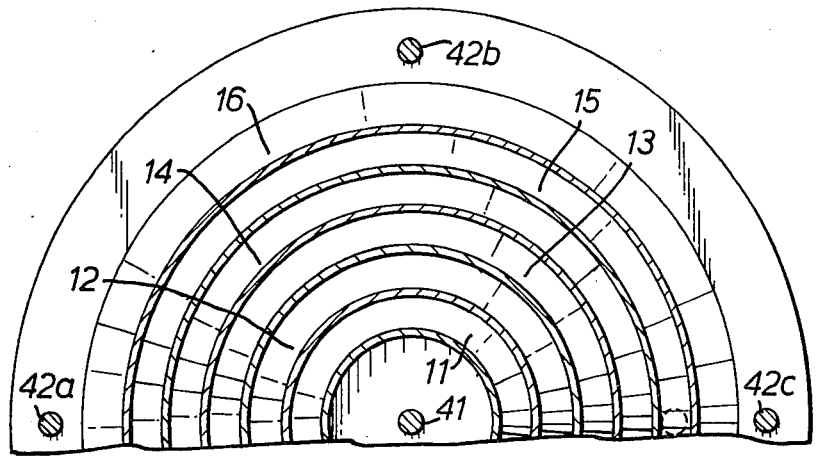
FIG. 2 is a partial sectional plan view of the apparatus of FIG. 1, taken along line II—II.

The embodiment 10 of the invention which is shown in FIGS. 1 and 2 comprises a plurality of concentrically disposed electrodes, each of which is a frustum of a hollow cone. In this embodiment there are five electrodes 11 – 15 of which the outermost is surrounded, at least when the assembly is to be operated immersed in electrolyte, by a similar electrically inoperative shielding member 16. The ends of electrodes 11 – 15 and of shielding member 16 abut against resilient insulating and sealing layers 21, 22, formed for example of a natural or synthetic elastomeric material applied to respective rigid support plates 31, 32 which are resiliently urged together by a central bolt or pillar 41 and by a plurality of circumferentially disposed bolts or pillars, of which only three are shown at 42a, b, c, having beneath their clamping nuts 43a–d at their upper ends an appropriate nest of Belville or other spring washers 44a, b, c.

This embodiment of apparatus in accordance with the invention is arranged for immersion in a receptacle containing an electrolyte 50. In FIG. 1 only the bottom of this container is indicated at 51, while the surface of the electrolyte is shown at 52.

In each of the intermediate electrodes 12 – 14 there is provided at least one aperture near its top edge. Such apertures in electrodes 12, 13 and 14 are shown at 60, 61, 62. As the assembly is immersed in the electrolyte, this flows into the space between electrodes 15 and 14 through an inlet aperture 33 provided in lower support plate 31. Upon reaching the level of aperture 62 the electrolyte flows into the space between electrodes 14 and 13, and so on, the displaced air passing out through an outlet aperture 34 provided in upper support plate 32.

Electrical connections to electrodes 11 and 15 are provided by leads 17, 18 respectively which are insulated and which pass sealingly through upper support plate 32 and are taken to a suitable direct voltage source 70 having respective negative and positive terminals 71, 72.

Inlet and outlet apertures 33, 34 of assembly 10 are advantageously provided with respective tubulations 81, 82.

When voltage is first applied to the immersed assembly 10 from source 70 current will initially flow between electrodes 11 and 15 by way of the intervening electrolyte and apertures 60, 61, 62, producing gas mostly at the surfaces of electrodes 11 and 15. Gas produced with the cell 4 formed between electrodes 14 and 15 will collect at the top of the cell and will lower the level of the electrolyte until the gas can escape through aperture 62 into cell 3 formed between electrodes 13 and 14. The flow of electric current through aperture 62 is now greatly reduced and gas is now generated at electrode 13 as well as at electrode 14. This gas lowers the level of electrolyte in cell 3 in turn, until aperture 61 is no longer immersed, after which gas is generated at both surfaces of electrode 14. The process is repeated in cell 2, so that all of apertures 60, 61, 62 become free of electrolyte and gas is being generated at all the electrode surfaces exposed to the electrolyte.

The generated gas forms with the electrolyte a foam which has an electrical conductivity much lower than that of the liquid electrolyte. The cells may finally contain liquid electrolyte up to only one half of their depth, the remainder of the cell containing electrolyte foam. A circulation of electrolyte foam now commences, foam leaving the assembly by way of outlet aperture 34 and fresh electrolyte entering through inlet aperture 33. The rate of circulation increases with the rate of gas production.

It may also be found advantageous in some circumstances to arrange that the centres of the apertures in adjacent electrodes are aligned upon a common line which may be inclined to the horizontal. In FIG. 1 the holes 60, 61, 62 are aligned upon a centre-line 63 inclined upwardly in the direction of electrolyte circulation. In some embodiments this centre-line may be horizontal, or even inclined downwardly.

It may be found advantageous to displace the apertures in adjacent electrodes from direct alignment with one another as illustrated in FIG. 1 so as to increase the length of the initial leakage path. The foam path between openings not directly aligned or facing each other is longer, and therefore the foam has more time to liberate gas and again form a partly liquid electrolyte while still within the cell. This in turn helps to keep the liquid level in cells 1, 2, 3 and 4 at a higher level. This is important when the rate of gas generation is required to be as high as possible and avoids the risk of a cell being wholly depleted of electrolyte by too high a rate of foam production. An increased amount of foam in a cell increases the cell resistance and thus reduces the current passing through the whole apparatus and lowers the rate of gas generation, which is proportional to current and hence to reduce the delay in coming into full gas production.

Although the illustrated embodiment described above includes only five electrodes, a practical embodiment may contain as many as 30 electrodes, the radial width of the cells being for example 5 mm and the height of the electrodes (distance between support plates) being for example 100 mm. The current applied to the apparatus from source 70 should be adjusted to a value such that the cells do not become wholly empty of electrolyte owing to too high a rate of gas production.

It is not necessary for the electrode assembly described in relation to FIGS. 1 and 2 to be immersed in bulk electrolyte as described above. An alternative arrangement, illustrated by FIG. 3, may be employed in which the inlet and outlet tubulations 81, 82 of an assembly 10 generally as described in relation to FIGS. 1 and 2 are connected to opposite ends of a system of pipes containing the electrolyte. Outlet tubulation 82 is extended to form a conduit leading sealingly into a reservoir 90, closed at its upper end by a screwed-on cover 91 and provided with a gas outlet conduit 92 through which the generated gas is taken for use. The bottom of reservoir 90, in which the electrolyte collects as gas escapes from foam introduced into the reservoir through conduit 82, is connected to inlet tubulation 81 by way of an extended cooling pipe or worm 93. Preferably the volume of electrolyte initially contained in the apparatus is sufficient to permit continuous gas generation for a prolonged period, such as eight hours. The electrolyte must be replenished with water from time to time, the amount required to be added corresponding to the volume of gas generated.

As in the arrangement of FIGS. 1 and 2, the innermost and outermost electrodes are connected by way of leads 17, 18 to the terminals of a direct-current source 70.

This modified arrangement is simpler to construct than that of FIGS. 1 and 2, in that a moulded or welded gas-tight tank large enough to accept the electrode assembly is not essential and only known pipe fittings are required for the electrolyte system.

The arrangements described with reference to FIGS. 1 – 3 require to be energized by a direct-current supply providing approximately 2–3 volts per cell of the electrode assembly. Since constructional problems limit the number of electrodes that can conveniently be used in one assembly to at most 30, the maximum voltage that can be applied to the apparatus is 90V, so that when the apparatus is to be energized from the public a.-c. supply a transformer is necessarily used to reduce the alternating voltage before rectification.

This difficulty may be overcome by using a plurality of electrode assemblies electrically connected in series. For a 220V a.-c. supply, which may be rectified by a normal bridge rectifier to yield a 220V d.-c. supply, it is convenient to use three electrode assemblies connected electrically in series and each including 24 cells or 25 electrodes. With such an arrangement the directly-rectified supply voltage may be employed to energize the apparatus.

An arrangement of the kind described above is illustrated by FIG. 4, which shows an apparatus 100 consisting of a closed container 52 provided with a gas outlet pipe 53 and a normally-sealed filling aperture 54 closed by a screw-on cover 55. This container is largely filled with electrolyte 50, in which are immersed three similar electrode assemblies 10a, 10b, 10c, each of the construction described in relation to FIGS. 1 and 2, but including 25 nested electrodes and hence requiring to be energized by a direct-current supply at a maximum of 75 volts. The three electrode assemblies are electrically connected in series across the output of a bridge rectifier 71 fed from the 220V public a.-c. supply 72 by insulated leads 17, 18, 19, 20.

It will be understood that when an apparatus as described above with reference to FIG. 4 is in use, passing a current of, for example, 15 amperes, the amount of gas generated will correspond to that which would be produced by a current of $(75 \times 15) = 1125$ A flowing in a single cell fed at 3V d.-c., for which the losses in the necessary transformer, high-current rectifiers and electrical conductors would be very much higher. With this alternative arrangement would also require forced circulation of the electrolyte through a cooler or cooling fins on the electrolyte tank to remove the heat generated in the cell.

Arrangements in accordance with the invention avoid the necessity for forced electrolyte circulation and also enable the electrical losses to be kept relatively low.

Figure 3:
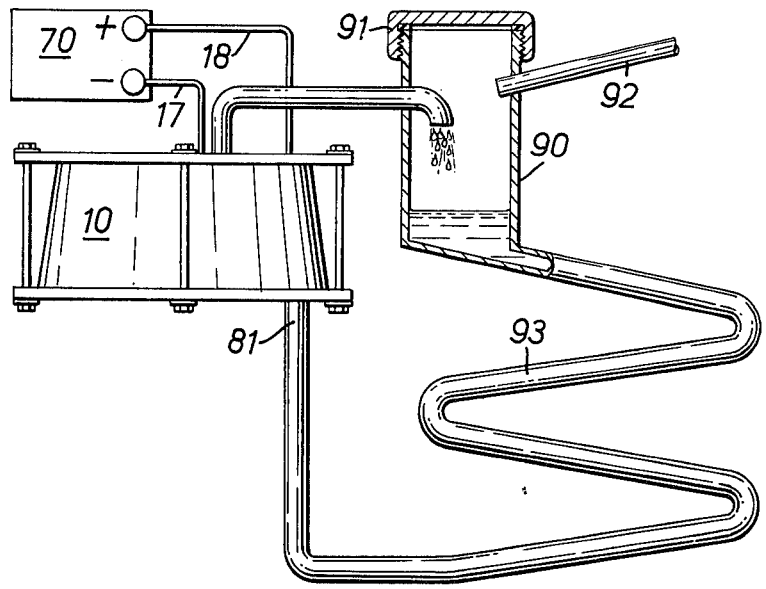
FIG. 3 is a schematic diagram illustrating a modification of the apparatus of FIGS. 1 and 2.
Figure 4:
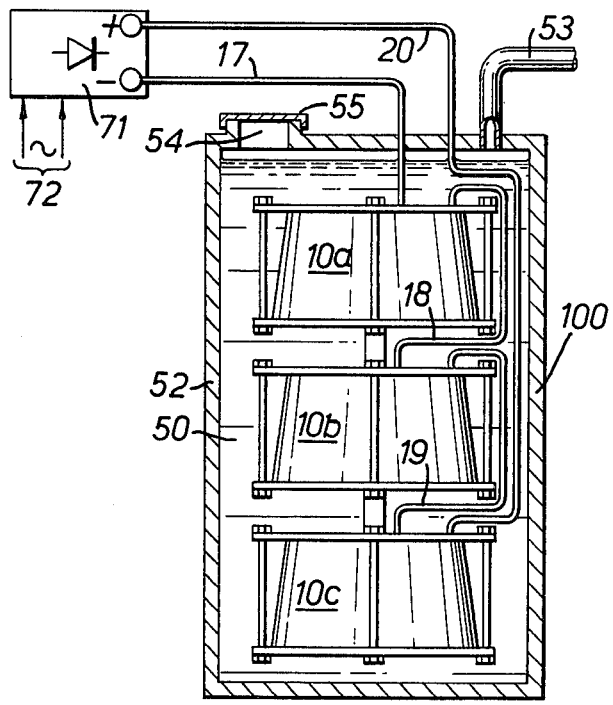
FIG. 4 is a schematic diagram illustrating another modification of apparatus in accordance with the invention.

When multiple electrode assemblies are used it is alternatively possible, instead of immersing them in a common tank as described in relation to FIG. 4, to provide each electrode assembly with its own individual electrolyte circulatory system as described in relation to FIG. 3, so that each assembly would produce circulation and cooling of its own electrolyte.

It is desirable in every embodiment to provide suitable means for controlling the magnitude of the current applied to the electrode system. This may, of course, be effected by known means such as tapped transformers and resistors. It is however preferred to provide for automatic regulation of the current. This may be effected as will be described with reference to FIG. 5.

Figure 5:
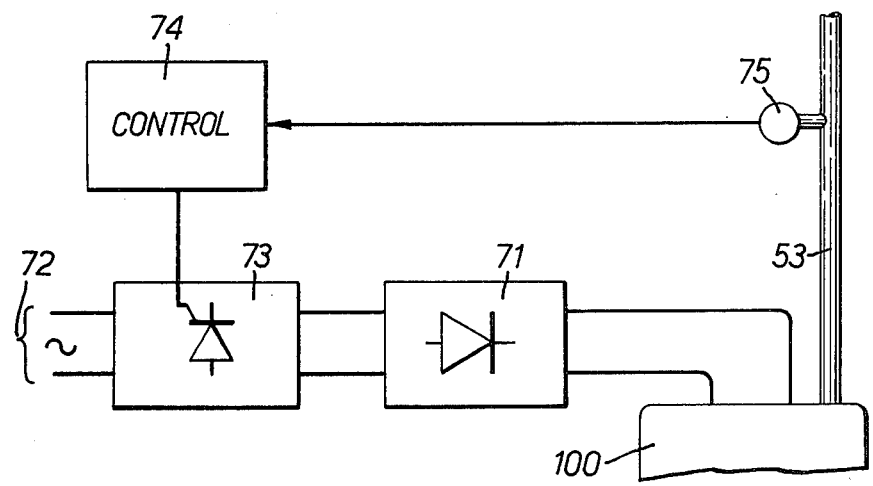
FIG. 5 is a schematic diagram illustrating a preferred manner of operating apparatus in accordance with the invention.

In FIG. 5 an apparatus 100 of the kind described in relation to FIG. 4 is arranged to be fed from a rectifier energized by a 220V a.-c. supply 72. In this embodiment, however, the passage of current from the supply 72 to the rectifier 71 is controlled by a known triac or thyristor control unit 73 in which the duty cycle of the control elements (triacs or thyristors) is determined by a triggering unit 74 responsive to a control signal, representative of the pressure in the gas outlet pipe 53 of apparatus 100, which is developed by a known pressure transducer 75 coupled to pipe 53.

It will be understood that in any of the embodiments it may be arranged that the magnitude of the current supplied to the electrodes may be controlled in accordance with the pressure of the generated gas. The means for producing this result in the different embodiments differ from that described in relation to FIG. 5 only in ways which will be fully apparent to those skilled in the art of feedback controls.

Figure 6:
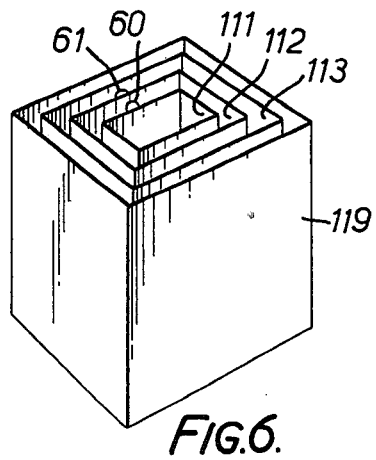
FIGS. 6 and 7 are schematic perspective representations of modified electrode arrangements for apparatus in accordance with the invention.
Figure 7:
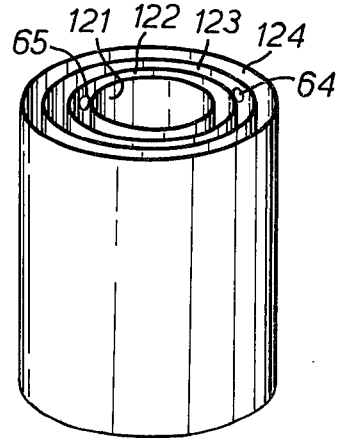

The particular form of electrodes illustrated in the foregoing embodiments is not an essential feature of the invention. The essential feature is that each electrode is formed by a laminar member surrounding an area and conveniently substantially equidistant from any adjacent inner or outer electrodes. However, it is not essential for the electrodes to be uniformly spaced. The outer electrodes are of larger area than the inner electrodes and since the same current flows in each cell the current density in the outer cells is lower. The amount of gas generated per unit volume of cell is therefore also lower if the interelectrode spacing is the same. It is therefore possible to reduce the interelectrode spacing in the outer cell, that is, the spacing between electrodes may be reduced as their diameter increases. The form of all the individual electrodes of any assembly is preferably geometrically similar. For example, FIG. 6 shows some electrodes 111–114 of an assembly in which each electrode has the form of an endless wall or hollow parallelepiped. The intermediate electrodes 112, 113 are pierced by holes 60, 61 equidistant from their upper edges. FIG. 7 shows part of an assembly of electrodes each of which is of the form of a hollow right cylinder, the intermediate electrodes 122, 123 being pierced by holes 64, 65 which are equidistant from the upper edges of the respective electrodes but are not circumferentially aligned, but are instead mutually angularly displaced by 180° though some other angle may be chosen if preferred.

In the case of embodiments as described in relation to FIGS. 1 and 2 the electrode assembly need not be wholly immersed in electrolyte. It is only necessary for the level of the electrolyte to be not lower than the uppermost of the holes pierced in the electrodes, so as to ensure that the electrolyte will enter all of the cells.

What I claim is:

1. Water decomposition apparatus for producing detonating gas, comprising
   (a) an electrode assembly including
      (1) a plurality of concentrically arranged vertically oriented hollow electrodes, the innermost and outermost electrodes being imperforate throughout their lengths, each of the intermediate electrodes containing adjacent its upper end at least one aperture;
      (2) upper and lower insulating and sealing members cooperating with the upper and lower ends of said electrodes to form concentrically arranged individual cells between each adjacent pair of said electrodes, respectively, said lower member containing an inlet opening in communication with one of the innermost and outermost cells, and said upper member containing an outlet opening in communication with the other one of said innermost and outermost cells;
      (3) means for supplying a liquid electrolyte into said one cell via said inlet opening, thereby to effect successive filling of said cells to the levels of the apertures associated therewith; and
   (b) means for applying a direct-current potential across said innermost and outermost electrodes, whereby the gas evolved in said cells by said potential flows toward said outlet opening via the apertures associated with said cells.

2. Apparatus as defined in claim 1, and further including a hollow shield member arranged concentrically about said electrode assembly, the upper and lower ends of said shield member being in sealed engagement with said upper and lower insulating and sealing members, respectively.

3. A water decomposition apparatus as claimed in claim 1, and further including tank means enclosing said electrode assembly, said tank containing a quantity of said electrolyte in which said electrode assembly is immersed.

4. A water decomposition apparatus as claimed in claim 1, wherein said inlet and outlet openings are coupled for liquid circulation therebetween by an extended duct containing said electrolyte and provided with outlet means for the gas generated in said electrode assembly.

5. A water decomposition apparatus as claimed in claim 1, wherein a plurality of said electrode assemblies are electrically connected in series, said direct-current source being connected across said series-connected electrode assemblies.

6. A water decomposition apparatus as claimed in claim 5, wherein said plurality of electrode assemblies are enclosed in a common tank, and further including a quantity of said electrolyte arranged in said tank in which said electrode assemblies are immersed.

7. A water decomposition apparatus as claimed in claim 5, wherein said inlet and outlet openings of each of said electrode assemblies are individually coupled for liquid circulation therebetween by a respective extended duct containing said electrolyte and provided with an outlet means for gas generated in said electrode assembly.

8. A water decomposition apparatus as claimed in claim 1, wherein said direct-current source is obtained from an alternating current source.

9. A water decomposition apparatus as claimed in claim 8, wherein said direct-current source includes rectifier means energized directly by said alternating current source.

10. A water decomposition apparatus as claimed in claim 1, and further including control means responsive to increasing pressure of the gas generated by said apparatus to reduce the magnitude of the electric current supplied by said potential source.

11. A water decomposition apparatus as claimed in claim 1, wherein each of said electrodes has the form of a hollow parallelepiped.

12. A water decomposition apparatus as claimed in claim 1, wherein each of said insulating members includes a layer of elastomeric material applied to a surface of a rigid supporting plate.

13. A water decomposition apparatus as defined in claim 1, wherein each of said electrodes has the form of a surface of revolution.

* * * * *